United States Patent
Mola et al.

(10) Patent No.: US 10,760,139 B2
(45) Date of Patent: Sep. 1, 2020

(54) METHOD FOR REPAIRING DEFECTS ON HOT PARTS OF TURBOMACHINES THROUGH HYBRID HOT ISOSTATIC PRESSING (HIP) PROCESS

(71) Applicant: Nuovo Pignone Tecnologie S.R.L., Florence (IT)

(72) Inventors: Paolo Mola, Florence (IT); Gabriele Masi, Florence (IT); Vincenzo Branchetti, Florence (IT); Stefano Costantino, Florence (IT)

(73) Assignee: NUOVO PIGNONE TECNOLOGIE S.R.L., Florence (IT)

( * ) Notice: Subject to any disclaimer, the term of this patent is extended or adjusted under 35 U.S.C. 154(b) by 327 days.

(21) Appl. No.: 15/797,441

(22) Filed: Oct. 30, 2017

(65) Prior Publication Data
US 2018/0142316 A1    May 24, 2018

(30) Foreign Application Priority Data
Nov. 18, 2016 (IT) .................. 102016000116950

(51) Int. Cl.
*B22F 3/15* (2006.01)
*C21D 1/34* (2006.01)
(Continued)

(52) U.S. Cl.
CPC .............. *C21D 1/34* (2013.01); *B22F 3/156* (2013.01); *C09K 5/14* (2013.01);
(Continued)

(58) Field of Classification Search
None
See application file for complete search history.

(56) References Cited

U.S. PATENT DOCUMENTS

| 4,499,048 A | 2/1985 | Hanejko |
| 5,618,768 A * | 4/1997 | Higuchi ............... C04B 35/593 |
| | | 501/92 |

(Continued)

FOREIGN PATENT DOCUMENTS

WO    WO-93/17819 A1 *  9/1993

OTHER PUBLICATIONS

Italian Search Report and Written Opinion issued in connection with corresponding IT Application No. 102016000116950 dated Sep. 12, 2017.

*Primary Examiner* — George Wyszomierski
(74) *Attorney, Agent, or Firm* — Baker Hughes Patent Organization

(57) ABSTRACT

In a hot isostatic pressing (HIP) method, the component to be treated, affected by imperfections, like porosity, cracks and cavities in its structure, is placed into a container together with non-metallic material in form of powder or grains having size greater than the porosity and the cracks and imperfections of the component. During the HIP process, the non-metallic material presses on the whole surface of the embedded component in order to generate a combination of temperature and forces capable to reduce defects, embedded and not embedded, in the component itself. The component is not contaminated during the process thus allowing easily removal of the non-metallic material by a simple operation of mechanical cleaning or chemical washing.

14 Claims, 1 Drawing Sheet

(51) Int. Cl.
    *C09K 5/14*         (2006.01)
    *B22F 3/24*        (2006.01)

(52) U.S. Cl.
    CPC ... *B22F 2003/241* (2013.01); *B22F 2003/247* (2013.01); *B22F 2998/10* (2013.01); *C21D 2241/02* (2013.01)

(56) References Cited

U.S. PATENT DOCUMENTS

| | | | | |
|---|---|---|---|---|
| 5,732,467 | A | * | 3/1998 | White .................. B23K 20/021 29/889.1 |
| 6,461,564 | B1 | | 10/2002 | Dilmore et al. |
| 2002/0005085 | A1 | | 1/2002 | Macki et al. |
| 2003/0088980 | A1 | * | 5/2003 | Arnold .................... B23P 6/007 29/889.1 |
| 2016/0158843 | A1 | | 6/2016 | Yolton et al. |

* cited by examiner

METHOD FOR REPAIRING DEFECTS ON HOT PARTS OF TURBOMACHINES THROUGH HYBRID HOT ISOSTATIC PRESSING (HIP) PROCESS

BACKGROUND OF THE INVENTION

The subject matter of this disclosure relates to a new repair method for hot parts of turbomachines based on the technique known as hot isostatic pressing (HIP). Hot isostatic pressing is a manufacturing process, typically used to reduce the porosity and internal defects of metals in order to improve the material's mechanical properties and the yield of the production process.

The HIP process submits the component to be treated, placed in a high pressure vessel, to both elevated temperature and elevated pressure, applied to the component in isostatic manner, through the use of a pressurizing gas. Inert gases are most widely used so that the material to be treated cannot chemically react during the process.

The HIP process is typically used for fixing or reducing shrinkage cavities and others internal casting defects. The simultaneous application of heat and high pressure works to eliminate or reduce material flaws like internal voids and micro-porosity through a combination of plastic deformation, creep, and diffusion bonding, thus improving mechanical resistance of the part treated and in particular its fatigue.

Furthermore, HIP can be used for the consolidation of powders, and for diffusion bonding—the solid state joining of two or more parts—(e.g. metal cladding or bonding of material not weld-able by fusion processes—the bonding together of dissimilar metals).

HIP is widely used to fix structural defects on metal components obtained through investment casting process and powder metallurgy process. The components are subject to a number of possible internal defects like, but not limited to: gas porosity, shrinkage cavities, cracks, hot tears, internal lack of fusion or bonding, and metallurgical defects. After the investment casting or the powder metallurgy process is completed, the resulting metal component is carefully examined to identify possible defects. Internal defects are normally fixed by HIP process. Alternative processes to fix mentioned defects are welding and brazing. This alternative processes are widely employed to repair or restore static parts, whereas their application is limited for rotary parts, being particularly critical parts. These methods typically show an important drawback: the component needs to be cleaned up through machining and mechanical treatments that can be expensive, difficult to perform and time consuming. The high pressure and temperature driven by HIP is capable to fix only embedded discontinuities (cracks, porosities, cavities, etc.)

SUMMARY OF INVENTION

Given the drawbacks of the prior art, a first embodiment of the subject matter of this disclosure is directed to a new method for repairing defects or restore parts for turbomachinery through hybrid hot isostatic pressing process.

The method comprises the steps of applying a first cleaning to the component to be treated and then placing the component in an hermetic metal container, for instance a canister, together with a non-metallic material and apply isostatic pressure and high temperature on the container. The isostatic pressure and high temperature are transmitted to the whole surface of the embedded component through the non-metallic material medium, in order to generate a combination of temperature and forces that press the material of the component under treatment, thus reducing flaws—embedded and not embedded—in the component itself.

Typically, but not exclusively, the non-metallic medium is provided in shape of powder or grains, the dimension of which is larger than the minimum dimension of the larger defect of the component under treatment in order not to allow the non-metallic medium penetrating the native defects of the component. This way, the non-metallic medium is adapt to only exert forces and heat on the overall surface of the component under treatment from the outside, thus transmitting heat and forces to the bulk material and fixing native defects.

After the treatment is complete, the non-metallic medium can be easily removed by a second cleaning phase comprising a selective operation of chemical washing or mechanical cleaning like, for instance, selective etching or mechanical disaggregation or their combination.

Furthermore, the non-metallic medium employed in the HIP process according to embodiments of the present invention is characterized by a fusion temperature higher than the fusion temperature of the metal of the component to be treated. This allows avoiding any penetration of the media—or possible contaminants generated from the media—inside the native defects of the component.

BRIEF DESCRIPTION OF THE DRAWINGS

These and other features, aspects, and advantages of embodiments of the present invention will become better understood when the following detailed description is read with reference to the accompanying drawings in which like characters represent like parts throughout the drawings, wherein.

DETAILED DESCRIPTION OF THE INVENTION

Figure 1:
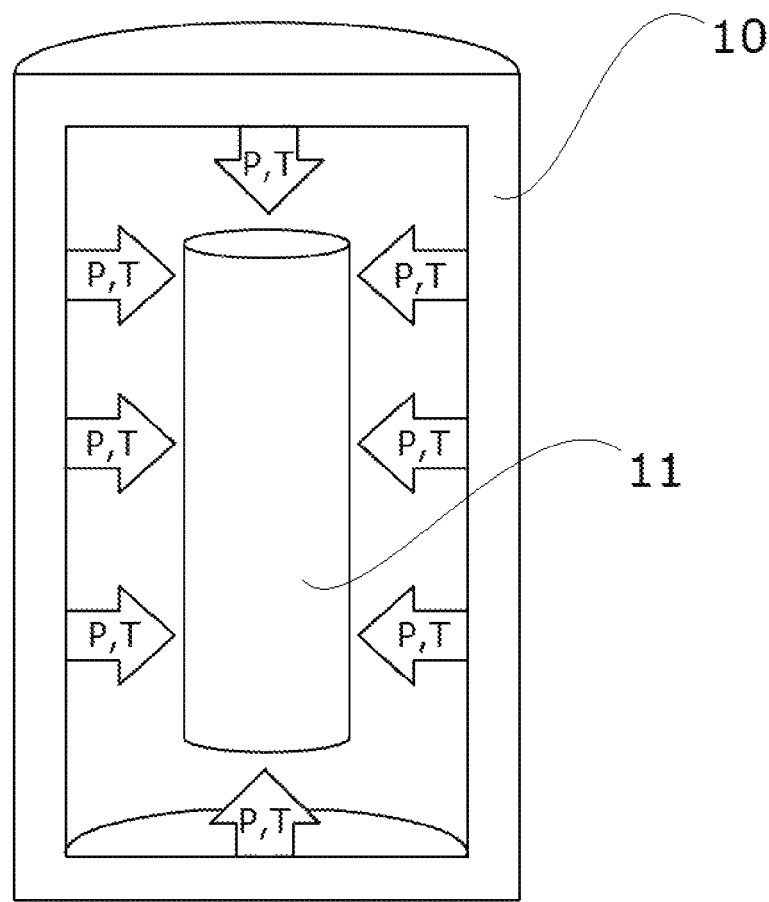
FIG. 1 illustrates a schematic diagram of a front section of a typical pressure vessel of the HIP process.
Figure 2:
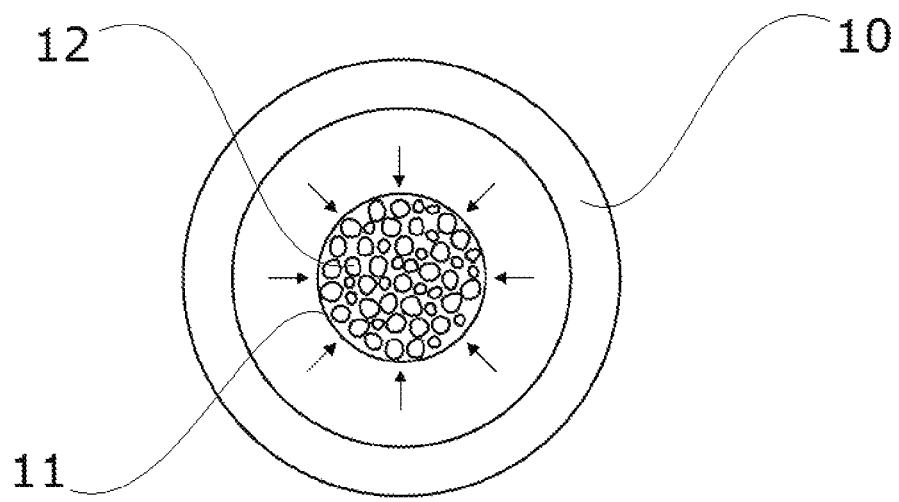
FIG. 2 illustrates a schematic diagram of a top section of a typical pressure vessel of the HIP process.

With reference to embodiments of the present invention, the HIP apparatus employed may be a HIP apparatus of the state-of-the-art.

A HIP apparatus generally comprises a HIP treatment vessel 10 and a press frame adapted to hold the vessel 10 under pressure. The treatment vessel, in turn, is leak-free and in an embodiment, houses a heater and a heat-insulating layer The defective component (a component affected by a defect as described above) to be treated may be a molded body or a casted body or an investment casting body or a body obtained through any powder metal process. Examples of metals may include cemented carbide, high speed steel, die steel, stainless steel, nickel alloy, titanium alloy, molybdenum alloy, cobalt alloy and all metals generally known as super-alloys.

The component to be treated is submitted to a first cleaning to remove contaminants that could harm the following steps. The first cleaning may be performed through chemical washing, through mechanical cleaning, through Hydrogen thermal cycle or through Fluoride Ion Cleaning (FIC). The mechanical cleaning may be chosen in the group comprising selective etching or mechanical disaggregation.

The component to be treated is placed within a metal hermetic container 11. The metal container 11 where the component under treatment is placed for HIP processing needs to be leak-free, therefore leak testing is generally performed on the metal container 11 beforehand. Typical materials used to produce the container 11 are low carbon steel and stainless steel, but any material adapted to survive HIP process conditions may be used like Ni alloys, Cobalt alloys, Ti alloys, etc. A medium 12 is then introduced within the metal container 11 to embed completely the component under treatment. The non-metallic medium 12 is typically but not exclusively provided in shape of powder or grains (but other shapes may be chosen) the dimension of which is larger than the minimum dimension size of the larger defect of the component under treatment in order not to allow the non-metallic medium 12 penetrating the native defects of the component. The medium 12 is typically introduced into the metal container 11 via a suitable fill-tube. Even just filling the container 11 with the chosen medium 12 will assure the correct working of the process, nevertheless, in order to maximize the efficiency of the process, it is preferable to achieve maximum and uniform packing of the medium 12 within the container 11, obtained, for instance, by adopting a pre-compacting process, typically applying a vibratory movement during the filling of the container 11.

The container 11 containing the component to be treated and filled by the chosen medium 12 is, at this point, evacuated from any gases that could be present and prevent the correct working of the process by flowing into the flaws of the component to be treated. This operation is typically referred to as outgassing and it is very important in order to assure the proper bonding of the surfaces forming the defect. It is necessary that gas does not penetrate into the native defects of the component to be treated otherwise bonding would not happen properly. For this reason, also the apertures used to perform the outgassing of the container 11 are sealed. Finally the container 11 is put inside the vessel 10 of the HIP unit and the HIP process is executed.

In case of critical applications, the filling operation may be done under inert gas or vacuum to minimize risk of contamination of the medium 12 and/or the component when it is introduced into the metal container 11.

Inert gas is normally employed as pressurizing gas during the HIP process. Typically Argon gas is used.

Furthermore, during the HIP process, the temperature, the inert gas pressure and holding time will vary depending on the material type of the component under treatment and on the material type of the employed medium 12.

Non-metallic media to be employed in the hybrid hot isostatic pressing (HIP) process according to embodiments of the present invention may be, for instance, of ceramic type taken from the group comprising: oxides (like alumina, magnesia, silica, zirconia, etc.), nitrides (like TiN, silicon-nitrides, boron-nitrides, etc.), carbides (like TiC, WC, silicon-carbides, boron-carbides, etc.), carbonitrides, borides, or their mixtures. The most important characteristic of the material to be used as a medium 12, in the method according to embodiments of the present invention, is the melting point and the decomposition temperature at the pressure and temperature applied to the sealed container 11. The melting point and the decomposition temperature of the employed medium 12 must be considerable higher (30% higher and more) than the one of the material of the component under treatment. In order to use finer media on larger imperfections, a sim, a plug or a patch fit, an insert or a tag could be coupled to the structural imperfections of the component under treatment.

Depending on the material to be treated by the method according to embodiments of the present invention, the inert gas may be applied at a pressure between 500 Bar (7250 Psi) and 3000 Bar (43500 Psi), in one embodiment pressure range being above 1000 Bar (14500 Psi).

Process inert gas temperature shall be lower than the melting point of the component to be treated and may range from 480° C. (896° F.) for aluminum castings to 1300° C. (2400° F.) for super-alloys. In one embodiment, the temperature range for super-alloys being above 1000° C. (1832° F.).

The holding time, again, depends on the material to be treated and it is generally kept greater or equal than 2 hours. In case of treatment of a component of an alloy including a HIP cycle in the production routing, then holding time is, in an embodiment, kept greater or equal to 120% of the time of the original HIP cycle performed during production. If the HIP cycle for a casted alloy is 5 hours, the holding time of the method according to embodiments of the present invention should be at least 6 hours.

The above description of exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A hot isostatic pressing method for repairing a metal component having structural imperfections, the method comprising:
   applying a first cleaning treatment to the component;
   placing the component into a hermetic metal container;
   introducing a non-metallic material medium into the container to completely embed the component;
   outgassing the container through container apertures to remove gases and water vapor from within the container;
   sealing the container apertures used to perform the outgassing;
   placing the container inside a pressurized heating vessel of a hot isostatic pressing apparatus;
   pressing and heating the container with predetermined pressure and temperature for a predetermined holding time interval;
   extracting the component from the container; and
   applying a second cleaning treatment to the component to remove the non-metallic medium.

2. The method according to claim 1, wherein the predetermined pressure is applied through pressurized inert gas and ranges between 500 Bar (7250 Psi) and 3000 Bar (43500 Psi).

3. The method according to claim 1, wherein the predetermined temperature ranges between 480° C. (896° F.) and 1300° C. (2400° F.).

4. The method according to claim 1, wherein the predetermined holding time interval is greater than or equal to 2 hours.

5. The method according to claim 1, wherein a metal chip selected from the group consisting of a sim, a plug, a patch fit, an insert and a tag is coupled to at least one of the structural imperfections of the component in order to reduce the minimum dimension of the larger structural imperfection of the component and therefore the dimensions of the medium.

6. The method according to claim 1, wherein the predetermined pressure is greater than or equal to 1000 Bar (14500 Psi).

7. The method according to claim 1, wherein predetermined temperature is greater than or equal to 1000° C. (1832° F.).

8. The method according to claim 1, wherein the non-metallic material is a ceramic material in a powder or grain form selected from the group consisting of oxides, nitrides, carbides, carbonitrides, borides, and any mixture of oxides, nitrides, carbides, carbonitrides and borides.

9. The method according to claim 1, wherein the non-metallic material is an oxide selected from the group consisting of alumina, magnesia, silica and zirconia.

10. The method according to claim 1, wherein the non-metallic material is a nitride selected from the group consisting of TiN, silicon-nitrides and boron-nitrides.

11. The method according to claim 1, wherein the non-metallic material is a carbide selected from the group consisting of TiC, WC, silicon-carbides and boron-carbides.

12. The method according to claim 1, wherein the first cleaning treatment applied to the component is performed by chemical washing, by mechanical cleaning, by Hydrogen thermal cycle, or by Fluoride Ion Cleaning (FIC).

13. The method according to claim 1, wherein the second cleaning treatment applied to the component is performed by chemical washing or by mechanical cleaning.

14. The method according to claim 1, wherein the first cleaning treatment is performed by selective etching or mechanical disaggregation.

* * * * *